United States Patent [19]

Stern

[11] Patent Number: 5,272,835
[45] Date of Patent: Dec. 28, 1993

[54] SELF-WATERING POT

[76] Inventor: Mark Stern, 800 Berkshire Ave., Flintridge, Calif. 91011

[21] Appl. No.: 977,569

[22] Filed: Nov. 17, 1992

[51] Int. Cl.$^5$ .............................................. A01G 25/00
[52] U.S. Cl. ............................................................. 47/79
[58] Field of Search .................................. 47/79, 59, 62

[56] References Cited

U.S. PATENT DOCUMENTS

| D. 278,075 | 3/1985 | Dryden | 47/48.5 |
|---|---|---|---|
| 738,508 | 9/1903 | Wilson | 47/79 |
| 3,125,255 | 3/1964 | Kaiser | 47/79 |
| 4,148,155 | 4/1979 | Allen | 47/79 |
| 4,562,959 | 1/1986 | Pointer, Jr. | 47/79 |
| 4,961,285 | 10/1990 | Jenkins et al. | 47/79 |
| 4,991,345 | 2/1991 | Bloch | 47/79 |

FOREIGN PATENT DOCUMENTS

6216 of 1888 United Kingdom .................... 47/79

*Primary Examiner*—Ramon S. Britts
*Assistant Examiner*—Joanne C. Downs
*Attorney, Agent, or Firm*—Christie, Parker & Hale

[57] ABSTRACT

A device is set forth for administering water to potted plants in a manner promoting optimal plant growth which comprises a cylindrical container to accommodate a plant and the necessary potting material. An irrigation chamber is positioned circumferentially inside the container. The irrigation chamber contains a plurality of serially arranged irrigation ducts that reside just above the soil surface. A transport channel connects the irrigation chamber to a water input pipe extending through from the container's outside wall. A valve is attached to the other end of the input pipe and a water supply line is attached to the input side of the valve. The water supply is turned on causing water to flow from the valve, through the input line, into the transport channel, and into the irrigation chamber. Finally, the water passes through the irrigation ducts and is uniformly distributed onto the soil surface. The valve is adjusted to regulate the quantity of water to accommodate the plant's particular water demand, thus, promoting optimal plant growth.

5 Claims, 1 Drawing Sheet

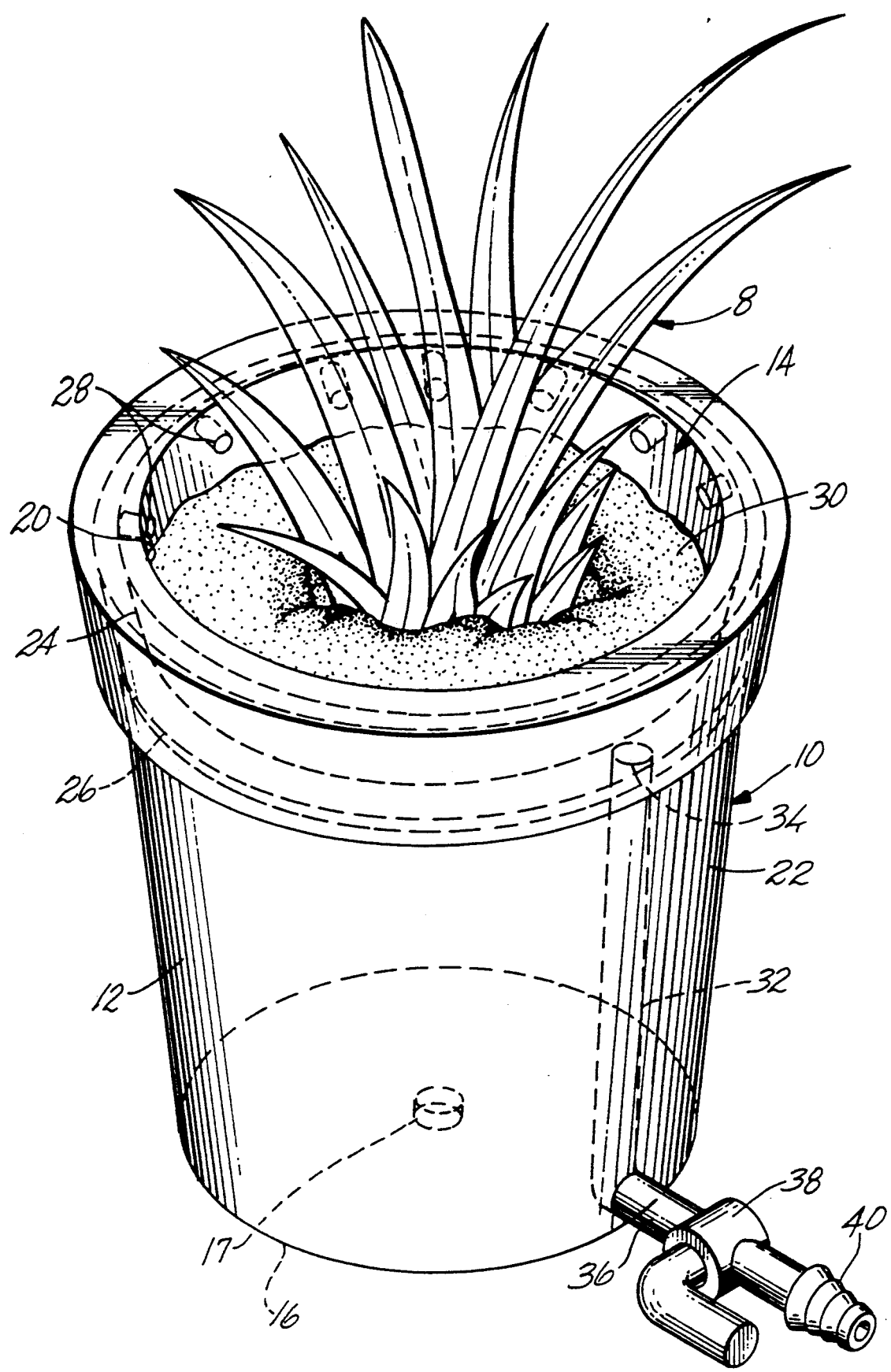

SELF-WATERING POT

FIELD OF THE INVENTION

This invention relates to devices used for watering plants and more particularity to a self-watering system for potted plants.

BACKGROUND OF THE INVENTION

When growing plants, whether it be in a yard, greenhouse or nursery setting, a substantial amount of time and labor is spent watering each plant. The amount of time and labor spent on this task is compounded by having to accommodate the individual water demand of each particular plant, some plants requiring more frequent watering than others. Therefore, the frequency of watering is largely dependant on the number and types of plants grown. For example, a homeowner may only need to water their yard once or twice a week to accommodate each plants water demand. On the other hand, a greenhouse or nursery operator must water their plant inventory on a daily basis to accommodate the various water demands for each variety of plant. In either case, optimal plant growth is dependant on each plant receiving a supply of water sufficient to meet its particular water demand.

Creating and implementing a watering schedule necessary to achieve optimal plant growth is a burdensome chore that often receives lower priority than other human needs or desires that would rather be addressed. Accordingly, a pattern of infrequent or sporadic water often develops. It is, therefore, desirable to have a watering device or system that can be used to administer water to potted plants on an automatic basis.

Watering devices or systems for administering water to potted plants on an automatic basis are known in the art. Such devices can be used to either water one potted plant or numerous potted plants, depending on the particular situation. The use of such devices are advantageous because they save the operator time and labor normally associated with the task of watering each plant by hand. Further, the use of such devices help to promote optimal plant growth since there is a higher likelihood that each plant's water demand will be met on a consistent basis.

One such device or watering system as described in U.S. Pat. No. 3,085,364 to Chapin, comprises a header pipe that is attached to a constant water supply source and positioned adjacent to a row of potted plants. Attached to the header pipe is a series of leader tubes that are routed to each plant. Each leader tube is attached by bracket to each pot and is directed to deliver the water at one location on the plant's soil surface. The device is used to administer water to each potted plant connected to the header pipe by the leader tube.

Although this device does permit self-watering for numerous potted plants, its use does not promote optimal plant growth because the device does not provide a means for regulating the amount of water administered for each individual plant. Instead, each plant receives an equal amount of water regardless of its individual water demand. Accordingly, some plants never receive the amount of water they require while other plants become over-watered. Further, the large potential for the device to over-water wastes water.

U.S. Pat. No. 3,357,129 to Torrance describes another watering device that comprises a header pipe connected to a water supply source. The header pipe contains multiple outlets to accommodate each individual plant. A valve is connected to each header outlet and a leader tube is connected to each valve outlet. Each leader tube is then routed to a potted plant and directed toward the plant's soil surface. Although this system has the added benefit of allowing the operator to regulate the quantity of water delivered for each plant it does not uniformly distribute the water to the soil surface.

Although the watering devices known in the art provide a means for watering a single or multiple potted plants, the use of these devices do not promote optimal plant growth. In addition to meeting the water demand of each plant, optimal plant growth is dictated by the effectiveness of the water reaching the plant roots. The devices known in the art deliver water to only one location on the plant's soil surface. This single location water delivery scheme produces a non-uniform distribution of water in the soil that results in only part of the soil receiving water while parts remain dry.

Also, many of the watering systems known in the art require the use of external tubing which is messy, unattractive and results in the cluttering of otherwise desirable work space.

It is, therefore, highly desirable to provide a watering device or system that can be used to administer water to an individual potted plant or multiple potted plants in a manner accommodating the water demand of each individual plant. It is also desirable that the device or watering system provide a means for effectively distributing the water delivered to each individual plant onto the soil surface. Finally, it is desirable that the device or watering system be easy to use and cost efficient to operate in terms of conserving water.

SUMMARY OF THE INVENTION

There is, therefore, provided in the practice of this invention according to a preferred embodiment, a self-watering pot for administering water to a potted plant in a manner promoting optimal plant growth. The device comprises an cylindrical container configured to accommodate a plant and the necessary potting material. An irrigation chamber is integrally enclosed within the container proximate the container's open end. The irrigation chamber contains a plurality of irrigation ducts serially arranged about its inside diameter. The irrigation ducts are of sufficient size to allow the passage of water and are directed toward the center of the container. A transport channel is integrally enclosed within the container and connects the irrigation channel to a water inlet pipe mounted to the outside surface of the container proximate its closed end. The water inlet pipe is connected to the outlet of a water valve and the valve inlet is connected to a water supply source.

The desired plant is placed inside the container and planting material is added until the soil surface resides slightly below the irrigation ducts. A water supply is connected to the water valve inlet and opened causing the water to travel through the value, into the inlet pipe, through the transport channel, into the irrigation chamber, through the irrigation ducts and onto the soil surface. The water valve is adjusted so that the irrigation ducts deliver the amount of water required to accommodate the plants water demand.

BRIEF DESCRIPTION OF THE DRAWINGS

These and other features and advantages will become appreciated as the same becomes better understood with reference to the specification, claims and drawings wherein:

FIG. 1 is an isometric view of a preferred embodiment of the present invention.

DETAILED DESCRIPTION OF THE INVENTION

FIG. 1 shows the preferred embodiment of the device 10 according to the present invention. The device comprises a hollow cylindrical container 12 having an open end 14 and a closed end 16. The closed end may have a drainage hole 17 to permit the escape of excess water. The container may be made from pottery, plastic, fiberglass, polypropylene, or any other appropriate material. The container is sized and configured to accommodate a plant and the necessary planting materials such as dirt, fertilizer or compost and the like required to sustain the plant.

An irrigation chamber 18 is integrally contained within the container between the container's inside wall 20 and outside wall 22. The irrigation chamber extends circumferentially about the container proximate the open end. Positioning the container with its open end at top and its closed end at bottom, the irrigation chamber is bound at its top by lip 24 connecting the inside wall and outside wall at the open end. The irrigation chamber is bound at its bottom by ridge 26. The ridge comprises a flat circular shaped member connecting the inside wall and outside wall a distance below the lip.

A plurality of irrigation ducts 28 are serially arranged about the inside wall of the container. The irrigation ducts are directed toward the center of the container and are positioned a distance below the open end to ensure water delivery onto the soil surface 30. The arrangement of the irrigation ducts provides for an omnidirectional delivery of water from the container's inside wall onto the plant's soil surface. This omnidirectional delivery pattern ensures uniform water distribution, soil saturation and water to root contact, thereby, promoting optimal plant growth.

Transport channel 32 is integrally contained within the container residing between the inside wall and outside wall. The transport channel comprises a tube having a diameter approximately equal to the thickness of the container which extends vertically from the container's closed end to a location proximate the open end 20. The transport channel intersects the irrigation chamber at chamber inlet 34 along ridge 26 which is of sufficient size to accommodate the transport channel.

Inlet pipe 36 is attached at one end to the outside wall proximate the container's closed end 16. The inlet pipe is of sufficient length to permit its installation through the outside wall and into the transport channel. Attached to the inlet pipe's other end is the outlet of a water valve 38. The water valve may comprise a needle valve or any other type of valve appropriate for regulating the flow of liquid. Nipple 40 is attached to the inlet of the water valve and is of sufficient size to accommodate connection with a water supply line.

The desired plant 8 is placed within a suitably sized container 12 and planting materials such as dirt, fertilizer, compost and the like are added until the soil surface resides just below the irrigation ducts 28. The device is then placed in a suitable location having access to a water supply line. The water supply line is then connected to the nipple 40. The water valve 38 is turned to the shut position and the water supply is turned on. The water valve is turned to the open position causing the water to travel through the water valve, into the inlet pipe, through the transport channel and into the irrigation chamber. After entering the irrigation chamber the water passes through the irrigation ducts which delivers the water onto the soil surface 30. The water valve is adjusted to accommodate the plant's water demand.

The irrigation chamber and its circumferential placement within the container surrounding the plant and soil surface allows the irrigation ducts to administer water to the dirt surface from all directions. This omnidirectional water delivery increases the efficiency of the watering process because it provides a uniform water distribution, thus, a higher likelihood of water to root contact promoting optimal plant growth.

This invention could either be used to provide a continuous delivery of water to the soil surface or to provide an intermittent water delivery through the use of a timing device connected to the water supply.

This invention can be used to provide a watering system for multiple potted plants by placing each plant in a suitably sized container, placing each device near a water supply header, and connecting the nipple of each device to the water header by means of a tube or the like. After the water supply is opened, the water valve of each device is adjusted to provide the amount of water necessary to accommodate the water demand of each individual plant.

It is to be understood that although but one exemplary embodiment of the device has been described and illustrated herein, many variations will be apparent to those skilled in the art. For example, it is to be understood that the container of the exemplary embodiment may comprise different configurations such as rectangular, square or hexagonal and the like.

It is also to be understood within the scope of this invention that irrigation chamber and transport channel may be configured as a non-integral element of the container. For example, the irrigation chamber may comprise an independent circular tubing assembly attached about the inside wall of the container at a depth just above the soil surface. Similarly, the transport channel may comprise a tube running vertically through the soil layer along the inside wall of the container and connecting the irrigation chamber to the inlet pipe. This embodiment would permit the retrofitting of the invention with existing plant pots or permit the use of the invention with any thin walled container.

Alternative embodiments of the device may include a container having a concave closed end, or bottom, forming an enclosure between the container and the ground or setting surface to house the water valve. The inlet pipe of this embodiment would be installed through the closed end of the container and connect with the water valve within the concave enclosure. The purpose of this embodiment would be to enhance the aesthetics of the device.

Since many such modifications may be made, it is to be understood that within the scope of the following claims, this invention may be practiced otherwise than specifically described.

What is claimed is:

1. A device for administering water to the soil surface of a potted plant, the device comprising;
a substantially cylindrical container comprising:

an open end;
closed end;
an inside wall; an outside wall;
a wall thickness defined by the distance between the inside and outside wall; and
the container being of sufficient size to accommodate a plant and necessary potting materials; an irrigation chamber comprising a tube positioned circumferentially inside the container above the soil surface and residing inside the container's wall thickness proximate the container's open end;
a plurality of irrigation ducts comprising serially arranged holes in the irrigation chamber of sufficient size to permit the passage of water, the irrigation ducts being directed toward the center of the container;
a valve for regulating water delivery to the irrigation chamber, the valve having an inlet and outlet side, the outlet side extending from outside the container through the container proximate the container's closed end; and
a transport channel comprising a tube of sufficient length connecting the irrigation chamber to the valve.

2. A device for administering water to the soil surface of a potted plant as recited in claim 1, wherein the water transporting means comprises a transport channel, the transport channel being an integral member of the container residing inside the container's wall thickness.

3. A device for administering water to the soil surface of a potted plant, the device comprising;
a cylindrical container having an open and a closed end and a wall thickness defined by an inside and outside wall;
an irrigation chamber integrally contained within the wall thickness of the container, the irrigation chamber extending circumferentially about the container's open end, the irrigation chamber being defined by a flat circular lip connecting the container's inside and outside wall at the open end and a flat circular ridge connecting the container's inside and outside wall at some depth below the container's open end,
a transport channel integrally contained within the wall thickness of the container, the transport channel comprising a tube having a diameter approximately equal to the distance between the inside and outside wall, the transport channel extending from a location proximate the container's open end to a location proximate the container's closed end the irrigation chamber having a plurality of irrigation ducts; the transport channel having two ends one of which with the irrigation chamber at a chamber inlet, the other transport channel end intersecting with the outside wall at a location proximate the closed end;
an inlet pipe comprising a tube passing through from the outside wall of the container into the wall thickness, the inlet pipe being positioned proximate the transport channel such that one end of the tube extends into the transport channel, the other end of the inlet pipe extends outwardly and away from the container's outside wall;
a valve for regulating water flow, the valve having an inlet and outlet side, the outlet side being connected to the inlet pipe end extending from the outside wall; and,
a nipple for accepting a suitable water supply line, the nipple being attached to the inlet end of the valve.

4. A method for administering water to a potted plant by using a device as recited in claim 3, the method comprising;
placing a plant into the container;
adding potting material such as dirt, fertilizer, compost and the like until the soil surface resides just below the irrigation ducts;
positioning the device near a suitable water source;
connecting the water supply source to the nipple;
turning the valve to the shut position and opening the water supply source;
turning the valve to the open position causing the water to travel through the valve and inlet pipe, into the transport channel and irrigation chamber, through the irrigation ducts and onto the soil surface;
adjusting the valve to permit administration of the correct quantity of water needed to accommodate the particular plant's water demand.

5. A method as recited in claim 3, wherein the device is used to administer water to a multiple number of potted plants by placing each plant into a separate device, positioning each device near a common water source and connecting the water source to the nipple of each device.

* * * * *